US010915083B2

(12) United States Patent
Hagihara

(10) Patent No.: US 10,915,083 B2
(45) Date of Patent: Feb. 9, 2021

(54) EQUIPMENT MANAGEMENT SYSTEM AND EQUIPMENT MANAGEMENT METHOD

(71) Applicant: TLV CO., LTD., Hyogo (JP)

(72) Inventor: Kazunari Hagihara, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 611 days.

(21) Appl. No.: 15/807,636

(22) Filed: Nov. 9, 2017

(65) Prior Publication Data
US 2018/0101155 A1    Apr. 12, 2018

Related U.S. Application Data

(63) Continuation of application No. PCT/JP2016/064659, filed on May 17, 2016.

(30) Foreign Application Priority Data

May 18, 2015    (JP) ................................. 2015-101440

(51) Int. Cl.
G05B 19/048        (2006.01)
G05B 23/02         (2006.01)
(Continued)

(52) U.S. Cl.
CPC ............ G05B 19/048 (2013.01); F16K 37/00 (2013.01); G01N 25/00 (2013.01); G01N 29/04 (2013.01);
(Continued)

(58) Field of Classification Search
CPC ................. G05B 19/048; G05B 23/02; G05B 2219/50068; G06Q 10/08; F16K 37/00;
(Continued)

(56) References Cited

U.S. PATENT DOCUMENTS

2005/0087235 A1*  4/2005  Skorpik ................. F16K 37/00
                                                                 137/554
2011/0036424 A1*  2/2011  Oike ................... F16K 37/0075
                                                                 137/551
2014/0043144 A1*  2/2014  Kurokawa .............. H04L 67/18
                                                                 340/10.4

FOREIGN PATENT DOCUMENTS

JP    2004-102693 A    4/2004
JP    2010-146186 A    7/2010
(Continued)

OTHER PUBLICATIONS

An Office Action issued by the European Patent Office dated Feb. 27, 2020, which corresponds to EP16796511.0-1222 and is related to U.S. Appl. No. 15/807,636.
(Continued)

*Primary Examiner* — Mohamed Charioui
*Assistant Examiner* — Eyob Hagos
(74) *Attorney, Agent, or Firm* — Studebaker & Brackett PC

(57) ABSTRACT

An equipment management system including a management device configured to manage operation states of at least some components forming a facility includes a plurality of detection units, a plurality of storage units, and an obtaining unit. The detection units are each arranged at the some components, each of the detection units being configured to detect state information and to transmit the state information and identification information to the management device. The storage units are each arranged at the some components, each of the storage units being configured to store location information. The obtaining unit is configured to obtain the location information from at least one of the storage units and to transmit the location information to at least one of the detection units. The at least one of the detection units (Continued)

together transmits the location information and the identification information to the management device.

5 Claims, 8 Drawing Sheets

(51) Int. Cl.
| | | |
|---|---|---|
| *F16K 37/00* | (2006.01) | |
| *G06Q 10/08* | (2012.01) | |
| *G01N 25/00* | (2006.01) | |
| *G01N 29/04* | (2006.01) | |
| *G06K 7/10* | (2006.01) | |
| *G06K 19/07* | (2006.01) | |

(52) U.S. Cl.
CPC ......... *G05B 23/02* (2013.01); *G06K 7/10366* (2013.01); *G06K 19/0723* (2013.01); *G06Q 10/08* (2013.01); *G05B 2219/50068* (2013.01)

(58) Field of Classification Search
CPC ........... G06K 19/0723; G06K 7/10366; G01N 29/04; G01N 25/00
See application file for complete search history.

(56) References Cited

FOREIGN PATENT DOCUMENTS

| JP | 2013-077128 A | 4/2013 | |
|---|---|---|---|
| JP | 5388337 B2 | 1/2014 | |
| JP | 2014-203166 A | 10/2014 | |
| JP | 2014203166 A * | 10/2014 | ........... G05B 23/024 |

OTHER PUBLICATIONS

An Office Action mailed by the European Patent Office dated Apr. 17, 2019, which corresponds to European Patent Application No. 16796511.0-1222 and is related to U.S. Appl. No. 15/807,636.
"Radio-frequency identification—Wikipedia", May 16, 2015 (May 16, 2015), XP055448521, Retrieved from the Internet: URL:https://en.wikipedia.org/w/index.php?title=Radio-frequency_identification&oldid=662603101#Telemetry [retrieved on Feb. 6, 2018].
"Enabling ubiquitous sensing with RFID—IEEE Journals & Magazine", Aug. 2, 2014 (Aug. 2, 2014), XP055448525, Retrieved from the Internet: URL:https://ieeexplore.ieee.org/document/1297315/#full-text-section [retrieved on Feb. 6, 2018].
International Search Report issued in PCT/JP2016/064659; dated Jun. 14, 2016.

* cited by examiner

FIG. 4

STATE INFORMATION TABLE

| DEVICE ID | STATE INFORMATION | DETERMINATION RESULT | LOCATION INFORMATION |
|---|---|---|---|
| XX-XX1 | (TEMPERATURE, VIBRATION, OBTAINING TIME) | NORMAL | (XX1,YY1) |
| XX-XX2 | (TEMPERATURE, VIBRATION, OBTAINING TIME) | LEAKAGE | (XX2,YY2) |

FIG. 5

STATE INFORMATION

| TYPE | STATE VALUE (°C, kHz) | OBTAINING TIME |
|---|---|---|
| TEMPERATURE | 98 | 2013/07/01 00:00:00:030 |
| VIBRATION | 40 | 2013/07/01 00:00:00:040 |

EQUIPMENT MANAGEMENT SYSTEM AND EQUIPMENT MANAGEMENT METHOD

CROSS-REFERENCE TO RELATED APPLICATION

This is a continuation of PCT International Application PCT/JP2016/064659 filed on May 17, 2016, which claims priority to Japanese Patent Application No. 2015-101440 filed on May 18, 2015. The disclosures of these applications including the specifications, the drawings, and the claims are hereby incorporated by reference in their entirety.

FIELD

The present disclosure relates to an equipment management system etc. configured to manage operation states of at least some components forming a facility such as a plant.

BACKGROUND

A facility such as an electric power plant, an oil manufacturing device, a refinery, a gas plant, or a chemical plant includes a plurality of components such as steam traps. Such a facility employs an equipment management system configured to manage operation states of the components (see, e.g., Japanese Patent Publication No. 2010-146186).

In the equipment management system, a detection device with a sensor is, for example, arranged at each steam trap, and state information detected by each sensor, such as a temperature, is transmitted from the detection device to a management device via a network. Then, in the management device, the received state information is managed, as well as the state (normal, abnormal, etc.) of each steam trap is determined based on the received state information etc.

In the management device, management is made such that the above-described state information, a determination result, etc. are associated with location information on each steam trap. An engineer performs maintenance such as replacement after having specified, based on the location information, a steam trap determined as abnormal. Thus, when a detection device is newly arranged and default setting is made, the detection device (identification information) and the steam trap (the location information) are associated with each other in the management device.

SUMMARY

In the above-described configuration of the equipment management system, the process of associating the detection device (the identification information) and the component (the location information) with each other needs to be performed in the management device. However, in the case of a great number of components, the process is extremely complicated, and much time is required for the process. For example, in the above-described plant, several tens of thousands of steam traps are often arranged. Each combination of the steam trap and the detection device may be determined before arrangement of the detection devices, and information on these combinations may be registered in the management device. However, it is an extremely-complicated process to arrange, according to the combinations, the detection devices at the several tens of thousands of steam traps. Moreover, there is a probability of erroneously setting the combinations.

The present disclosure is intended to provide an equipment management system capable of easily associating a detection device configured to detect an operation state of a component with location information on the component and to provide an equipment management method for the equipment management system.

According to a first aspect of the present disclosure, an equipment management system including a management device configured to manage operation states of at least some components forming a facility includes a plurality of detection units, a plurality of storage units, and an obtaining unit. The detection units are each arranged at the some components, each of the detection units being configured to detect state information on a corresponding one of the some components at which the each of the detection units is arranged and to transmit the state information and identification information to the management device. The storage units are each arranged at the some components, each of the storage units being configured to store location information on a corresponding one of the some components at which the each of the storage units is arranged. The obtaining unit is configured to obtain the location information from at least one of the storage units and to transmit the location information to at least one of the detection units. The at least one of the detection units together transmits the location information, which has been received from the obtaining unit, and the identification information to the management device. The management device stores the identification information and the location information, which have been received from the at least one of the detection units, in association with each other. The management device stores the identification information and the state information, which have been received from the at least one of the detection units, in association with each other.

The storage units may be RFID tags, and the obtaining unit may be an RFID reader.

The RFID reader may be included in each detection unit.

The equipment management system may further include updating units each arranged at the some components, each of the updating units being configured to update the contents of the each of the storage units of a corresponding one of the some components at which the each of the updating units is arranged. The each of the storage units may store an association between the identification information and the location information for the corresponding one of the some components in the management device. The each of the updating units may update the association in the each of the storage units according to an instruction of the each of the detection units of the corresponding one of the some components.

The some components may be steam traps configured to discharge drain caused in the facility. The each of the detection units may detect, as the state information, the temperature or vibration of a corresponding one of the steam traps.

According to a second aspect of the present disclosure, an equipment management method for an equipment management system including a management device configured to receive, from detection units, state information on at least some components forming a facility to manage operation states of the some components includes the step of obtaining, by a communicable obtaining unit, location information on at least one of the some components from at least one of storage units each arranged at the some components, the step of together transmitting, after at least one of the detection units arranged at the at least one of the some components has received the location information on the at least one of the some components from the obtaining unit, the location information and identification information on the at least one of the detection units to the management device, and the step of storing the identification information on the at least one of the detection units and the location information on the at least one of the some components in association with each other in the management device, and storing the identification information and the state information, which have been received from the at least one of the detection units, in association with each other in the management device.

According to the present disclosure, the location information on the component is stored in the storage unit arranged at the component, and is obtained by the detection unit via the obtaining unit. Then, the identification information on the detection unit and the location information are transmitted from the detection unit to the management device. In the management device, the identification information and the location information are, after reception from the detection unit, stored in association with each other. The storage unit storing the location information is, as described above, arranged at the component. The detection unit having a communication function obtains the location information, and transmits the location information to the management device. Thus, in the management device, the detection unit and the location information on the component can be easily associated with each other.

BRIEF DESCRIPTION OF THE DRAWINGS

FIG. 4 is an example of a state information table stored in a database of the management device.

FIG. 5 is a table showing an example of detailed contents of state information of the state information table.

DESCRIPTION OF EMBODIMENTS

An equipment management system and an equipment management method for the equipment management system according to embodiments of the present disclosure will be described with reference to the drawings. A trap management system configured to manage an operation state of each steam trap used for a steam plant facility (a process system) will be described below as an embodiment of the equipment management system of the present disclosure. Note that a configuration of the present disclosure is not limited to each embodiment. Moreover, the order of various types of processing forming various flows described below may be a random order without inconsistency etc. of the processing contents.

First Embodiment

First Hardware Configuration of Trap Management System 100

Figure 1:
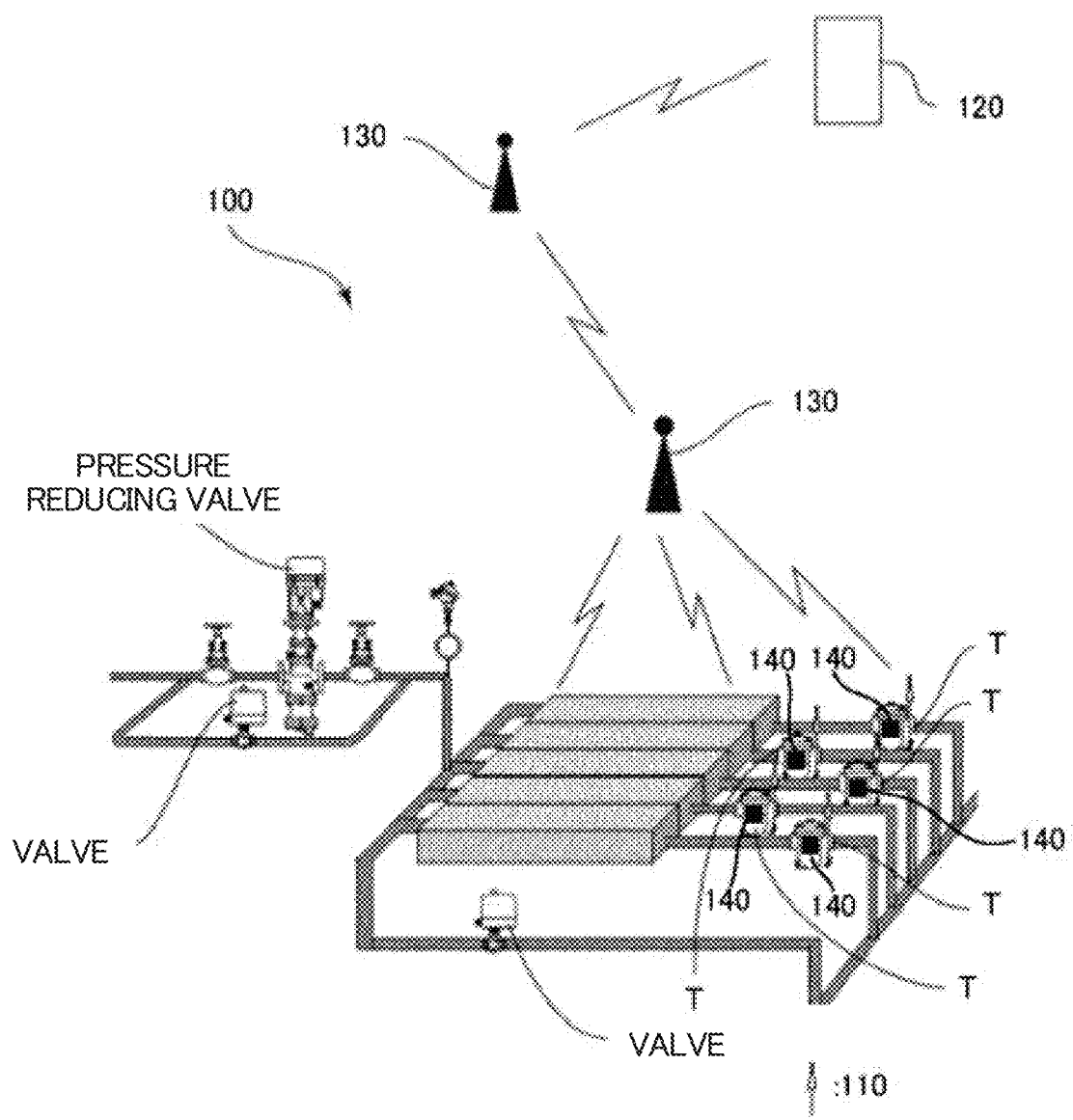
FIG. 1 is a view of a configuration of a trap management system as an embodiment of an equipment management system of the present application.

A trap management system 100 will be described with reference to FIG. 1. The trap management system 100 is configured to manage, using wireless communication, operation states of many steam traps (hereinafter referred to as "traps") T dispersively arranged at a steam plant facility. The trap management system 100 has detection devices (detection units) 110, a management device 120, communication relay devices (relays) 130, and RFID tags (storage units) 140.

Moreover, in the trap management system 100, the radio frequency identification (RFID) tags 140 and RFID readers/writers 116 (see FIG. 2) are used to associate, in the management device 120, each detection device 110 configured to detect state information on the trap T with location information (location data) on the trap T targeted for detection. Details will be described later.

Figure 6:
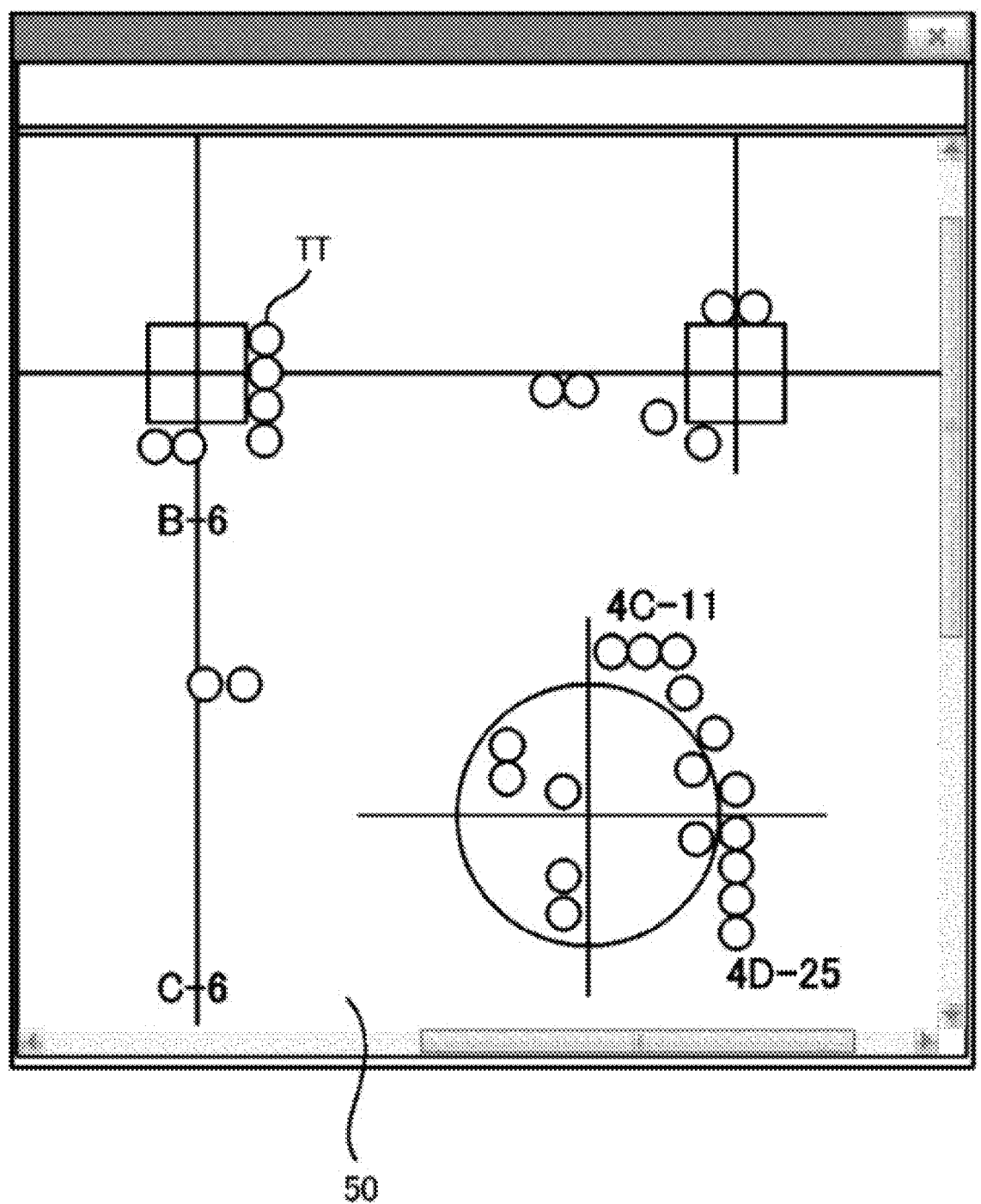
FIG. 6 is a view of an example of an arrangement map image showing arrangement locations of traps in a facility.

The management device 120 is configured to transmit, to the communication relay device 130, transmission request information for requesting transmission of the state information detected by the detection devices 110, thereby obtaining the state information of the detection devices 110 from the communication relay devices 130. Then, the management device 120 manages the state information on each trap T in a database 123 (see FIG. 3), and determines the operation state of such a trap T. Moreover, the management device 120 generates, for example, information on a plant arrangement map image 50 indicating the arrangement location of each trap T as illustrated in FIG. 6 for the purpose of displaying such information on a display (not shown).

The communication relay device 130 is configured to transmit the broadcast transmission request information for requesting transmission of the state information to all of the detection devices 110 directly communicable with the communication relay device 130 itself. Note that the communication relay device 130 has a typical configuration, and therefore, detailed description thereof will not be made.

Each detection device 110 is placed at a corresponding one of the traps T in the facility. The detection device 110 is configured to detect (measure) the state information of the trap T. The state information includes, for example, the temperature and ultrasonic wave (vibration) of the trap T. When obtaining the broadcast transmission request information from the communication relay devices 130, the detection device 110 transmits, together with a device ID, the detected state information to the communication relay device 130. The device ID is unique identification information provided to each detection device 110.

Each RFID tag 140 has a memory (not shown) such as an EEPROM, and is arranged on an outer peripheral surface of a corresponding one of the traps T. The RFID tag 140 stores, in the memory, the location information of the trap T on which the RFID tag 140 is arranged, and transmits the location information in response to a transmission request from the RFID reader/writer 116 (see FIG. 2) of the detection device 110 arranged at the same trap T. Note that the RFID tag 140 has a typical configuration, and therefore, detailed description thereof will not be made.

Second Hardware Configuration of Detection Device 110

Figure 2:
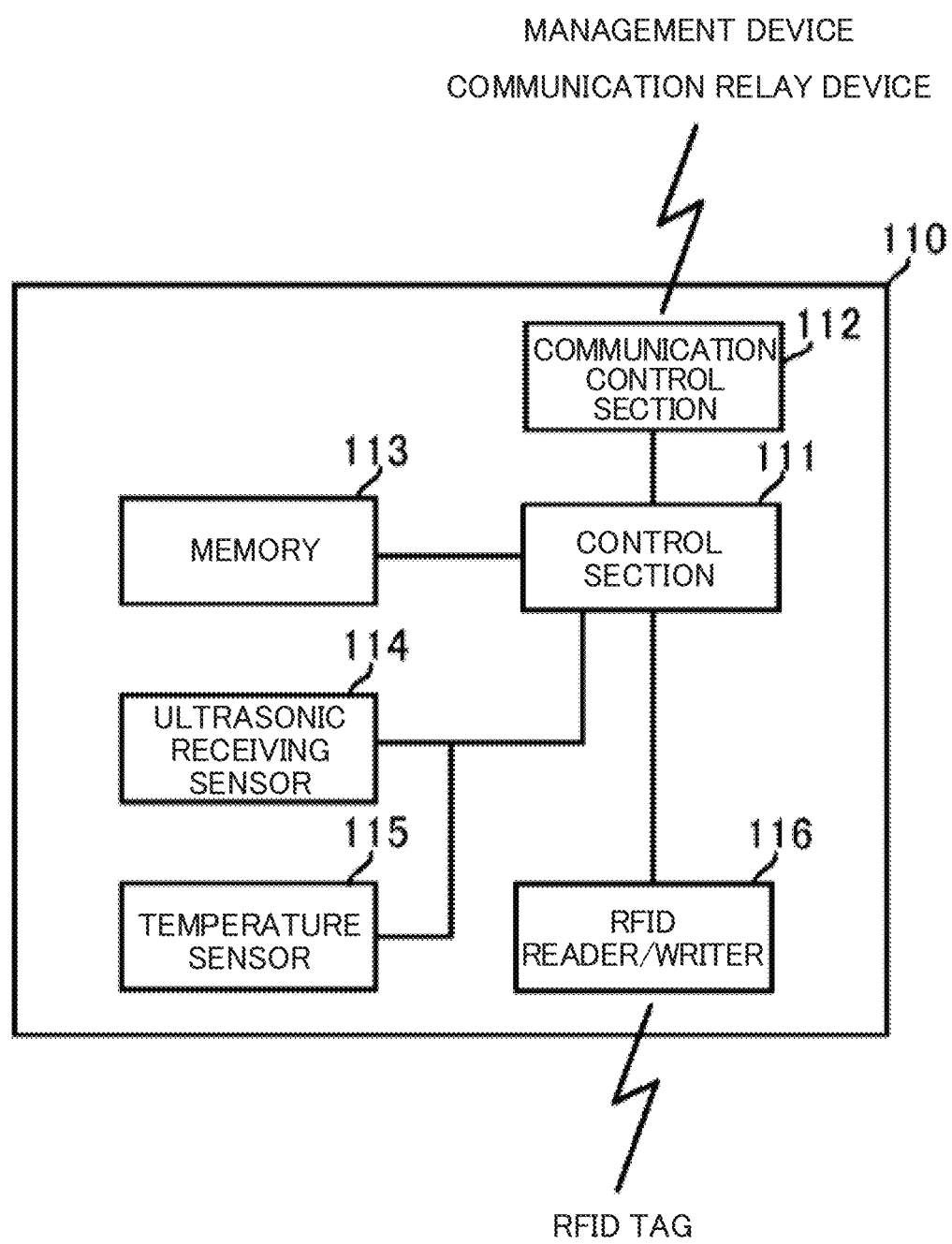
FIG. 2 is a block diagram of a detection device forming the trap management system.

FIG. 2 is a block diagram of the detection device 110. The detection device 110 has a control section 111, a communication control section 112, a memory 113, an ultrasonic receiving sensor 114, a temperature sensor 115, and the RFID reader/writer (an obtaining/updating unit) 116. The control section 111 includes a CPU, a ROM, a memory, etc., and is configured to control operation of the entire device based on a program, data, etc. stored in the ROM. For example, the control section 111 stores, in the memory 113, the state information (numerical values) including the ultrasonic wave (the vibration) and the temperature received from the ultrasonic receiving sensor 114 and the temperature sensor 115. According to the broadcast transmission request information, the device ID and the state information are transmitted to the management device 120 via the communication control section 112 and the communication relay devices 130. Note that the detection device 110 is driven by a battery power source (not shown) such as a built-in lithium battery. Moreover, other types of information than the vibration and the temperature may be employed as the state information.

The communication control section 112 has a wireless communication circuit. The communication control section 112 is connected to a wireless local area network and a communication network including the plurality of communication relay devices 130, and via connection to the communication relay devices 130, controls communication with the management device 120 connected to the wireless local area network. The memory 113 is, for example, an EEPROM, and is configured to store, e.g., the device ID and the state information of the detection device 110.

The ultrasonic receiving sensor 114 and the temperature sensor 115 are configured to detect the ultrasonic wave (the vibration) and the temperature of a casing of the trap T, and transmits such information to the control section 111. The RFID reader/writer 116 is configured to perform near field wireless communication with the RFID tag 140 based on an instruction of the control section 111, thereby obtaining the location information from the RFID tag 140. Then, the location information is transmitted to the control section 111. Moreover, the RFID reader/writer 116 is configured to write later-described registration completion information in the memory of the RFID tag 140 based on an instruction of the control section 111. Note that the RFID reader/writer 116 has a typical configuration, and therefore, detailed description thereof will not be made. The RFID reader/writer 116 may be separated from the detection device 110, or may be arranged at the trap T with the RFID reader/writer 116 being communicable with the detection device 110.

Third Hardware Configuration of Management Device 120

Figure 3:
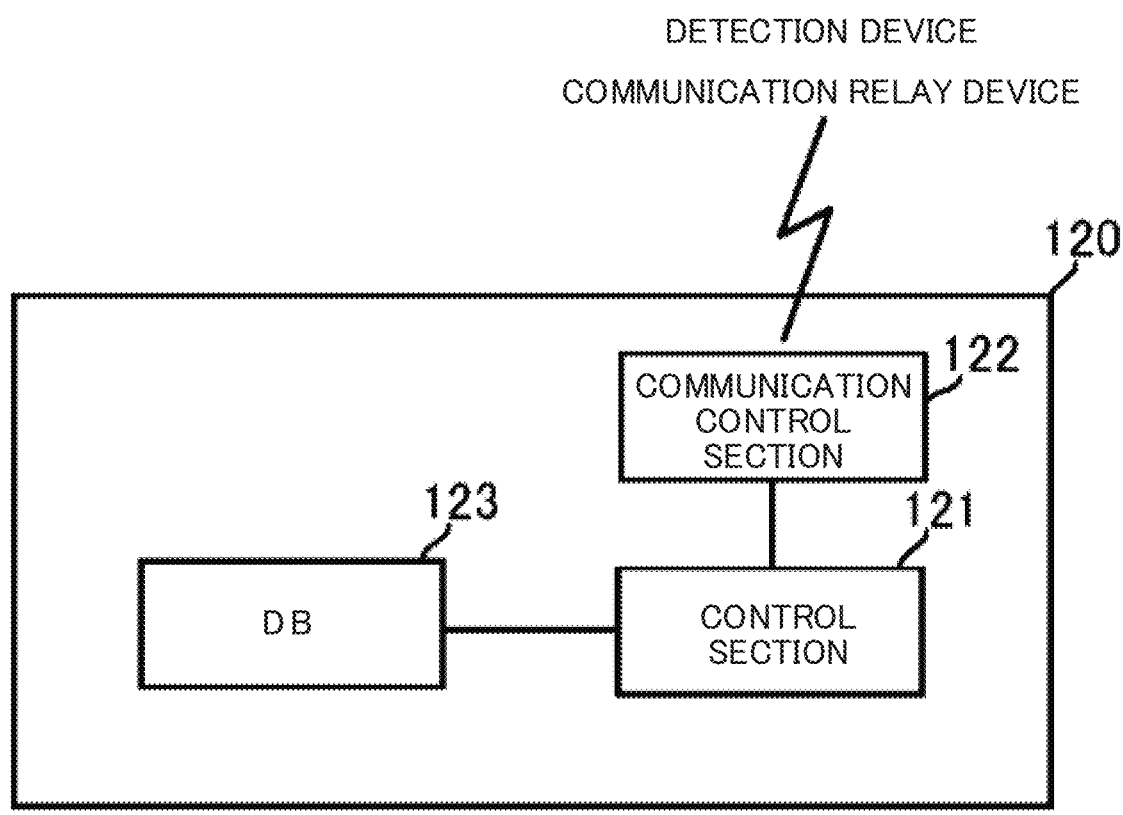
FIG. 3 is a block diagram of a management device forming the trap management system.

FIG. 3 is a block diagram of the management device 120. The management device 120 has a control section 121, a communication control section 122, and the database 123. The control section 121 includes a CPU, a ROM, a memory, etc., and is configured to control operation of the entire device based on a program, data, etc. stored in the ROM. For example, the control section 121 transmits, as described above, the transmission request information to the communication relay device 130, and stores (manages) the received state information on each trap T in the database 123.

The communication control section 122 has a wireless communication circuit. The communication control section 122 is connected to the wireless local area network and the communication network including the plurality of communication relay devices 130, and via connection to the communication relay devices 130, controls communication with the plurality of detection devices 110 connected to the wireless local area network. The database 123 is configured to store the state information and the location information on each of the plurality of traps T as illustrated in FIG. 4.

FIG. 4 shows an example of a state information table stored in the database 123 of the management device 120. In the state information table, the state information, a determination result, the location information, etc. on each trap T are registered in association with the device ID of a corresponding one of the detection devices 110. As shown in FIG. 5, an operation state type, a state value, a state value obtaining time are, as the state information, registered in association with each other. FIG. 5 is a table showing an example of detailed contents of the state information of the state information table.

The determination result is a result of determination on the operation state of each trap T based on the state information by the management device 120. For example, the determination result is numerical information for specifying normal, leakage, and inactivation. The "leakage" indicates a determination result showing that steam leaks from the trap T. The "inactivation" indicates a determination result showing that the trap T is in an inactivation state. The location information is information for specifying the arrangement location of each trap T. The location information is, for example, coordinate information for specifying the location of each trap T in the arrangement map image 50 illustrated in FIG. 6.

FIG. 6 is a view of an example of the arrangement map image 50 showing the arrangement locations of the traps T in the facility. The arrangement map image 50 includes, for example, icon images TT of the traps T. The locations of the icon images TT indicate places where the traps T are arranged. The management device 120 generates the arrangement map image 50 based on the above-described location coordinate of each trap T. Although not shown in the figure, the information such as the determination result is also displayed in the form of text in the vicinity of each icon image TT.

For example, an engineer accesses the management device 120 via a terminal device (not-shown). Subsequently, the information on the arrangement map image 50 as illustrated in FIG. 6 is received from the management device 120, and is displayed on a display of the terminal device. Then, the engineer can move, with reference to the arrangement map image 50, to the location of the trap T determined as the leakage. Note that generation of the arrangement map image 50 employs a typical configuration, and therefore, detailed description thereof will not be made.

Fourth Default Setting of Detection Device 110

In the trap management system 100, default setting of each detection device 110 is performed when such a detection device 110 is arranged at a corresponding one of the traps T. The default setting is, for example, setting of a network ID, a security key, etc. for starting wireless communication with the management device 120 and the communication relay devices 130. The above-described setting is, for example, made in such a manner that the engineer accesses the detection device 110 via wireless communication by means of the terminal device.

After completion of the default setting, new registration processing is started by the detection device 110. The new registration processing is the processing of storing (newly registering) the location information on the trap T at which the detection device 110 is arranged and the device ID of the detection device 110 in association with the state information table (the database 123) of the management device 120. Specifically, a registration request including the location information on the trap T and the device ID is transmitted from the detection device 110 to the management device 120, and then, is registered in the database 123. Subsequently, the registration completion information is transmitted from the management device 120 to the detection device 110.

After receiving the registration completion information, the detection device 110 writes the registration completion information in the memory of the RFID tag 140. Subsequently, transmission of the state information corresponding to the broadcast transmission request begins. Note that the RFID tag 140 may be arranged at the trap T, and the location information may be stored in the memory until the detection device 110 is arranged.

Fifth Operation of Trap Management System 100

Figure 7:
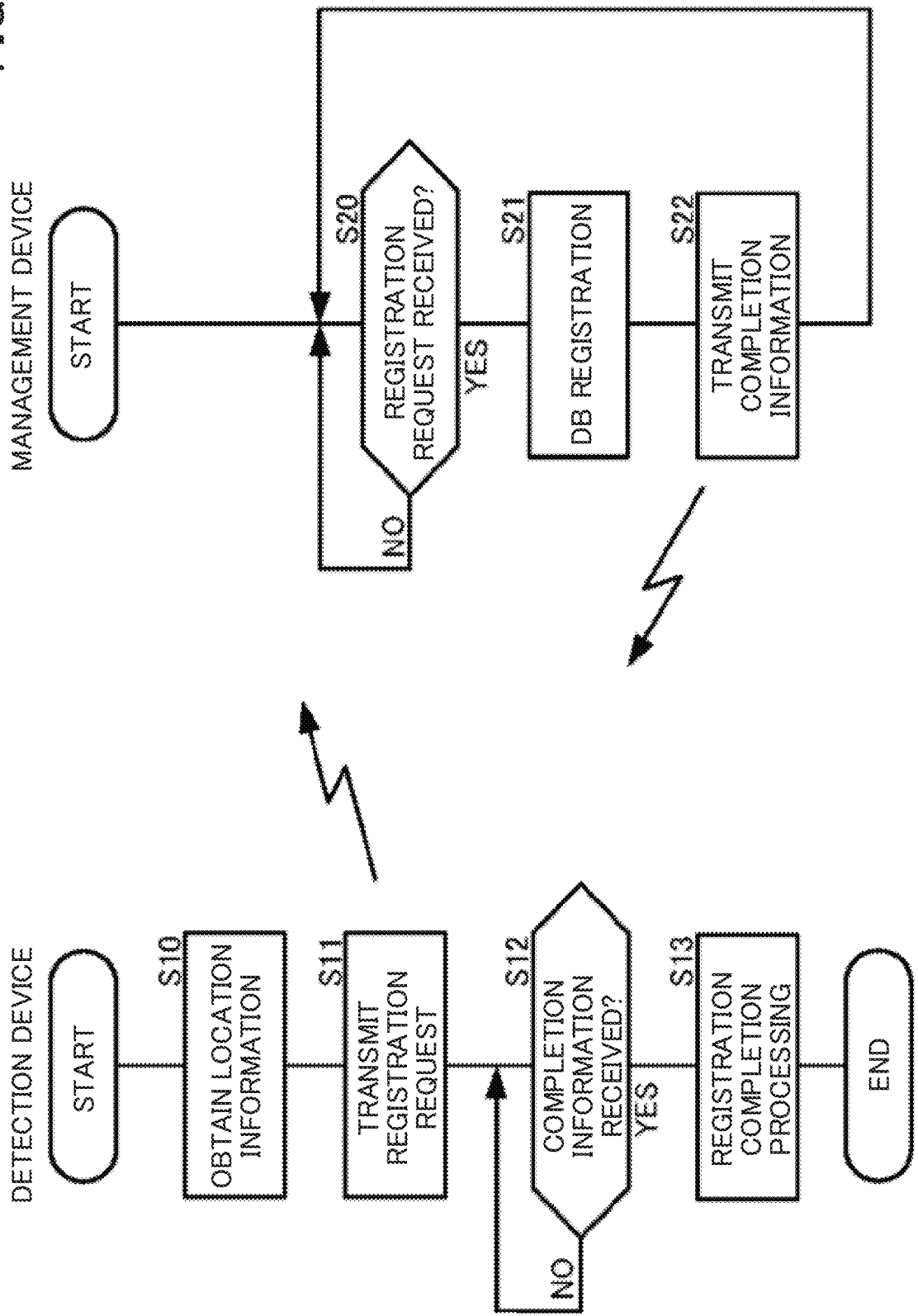
FIG. 7 is a flowchart of new registration processing of the detection device.

FIG. 7 is a flowchart of the new registration processing of the detection device 110. A condition is a trigger for start of the processing by the control section 111, the condition being non-completion of the new registration processing after establishment (completion of the default setting) of a communication session with the communication relay devices 130 etc. in the detection device 110. Note that based on the presence or absence of the registration completion information in the memory 113, it is determined whether or not the new registration processing is completed.

The control section 111 causes the RFID reader/writer 116 to obtain the location information from the RFID tag 140 (a step S10). Next, the control section 111 transmits the registration request with the device ID and the location information to the management device 120 via the communication relay devices 130 (a step S11). Subsequently, the processing is held until the registration completion information is received from the management device 120 (a step S12: YES).

When receiving the registration request (a step S20: YES), the control section 121 of the management device 120 registers the device ID and the location information in association with each other in the database 123 (a step S21). Specifically, the state information, the determination result, and the location information associated with the received device ID are added to the state information table. Then, the control section 121 transmits, via the communication relay devices 130, the registration completion information to the detection device 110 having transmitted the registration request (a step S22), and returns to the processing of the step S20.

When receiving the registration completion information (the step S12: YES), the control section 111 of the detection device 110 performs the registration completion processing (a step S13). Specifically, the registration completion information is stored in the memory 113. Further, the registration completion information is written in the memory of the RFID tag 140 via the RFID reader/writer 116.

As described above, the location information on the component (the trap T) stored in the storage unit (the RFID tag 140) is obtained by the detection unit (the detection device 110) via the obtaining unit (the RFID reader/writer 116), and the identification information (the device ID) on the detection device 110 and the location information are transmitted from the detection device 110 to the management device 120. Then, the device ID and the location information are stored in association with each other by the management device 120. The RFID tag 140 in which the location information is stored as described above is arranged at the component. The detection device 110 having a communication function obtains the location information, and transmits (sends the registration request) such information to the management device 120. Thus, the detection device 110 and the location information on the trap T can be easily associated with each other in the management device 120.

Note that in the above-described embodiment, the registration completion information is written in the RFID tag 140 in the registration completion processing of the step S13 of FIG. 7, but is not necessarily written. In this case, a writer function of the RFID reader/writer 116 is not necessary, and therefore, an RFID reader may be used instead of the RFID reader/writer 116.

Moreover, in the above-described embodiment, the registration completion information written in the RFID tag 140 is maintained without being deleted, but may be deleted in the case of removing the detection device 110 from the trap T. For example, before removing the detection device 110, the engineer transmits a deletion request from the terminal device to the detection device 110 via wireless communication. Then, the detection device 110 deletes the registration completion information from the RFID tag 140 based on the received deletion request. This can return the RFID tag 140 to a non-registered state (a default state).

Second Embodiment

This embodiment is different from the above-described first embodiment in a configuration in which no RFID reader/writer is included in a detection device. Such a different configuration will be described with reference to FIG. 8. Other configurations are similar to those of the first embodiment, and therefore, description thereof will not be repeated.

Figure 8:
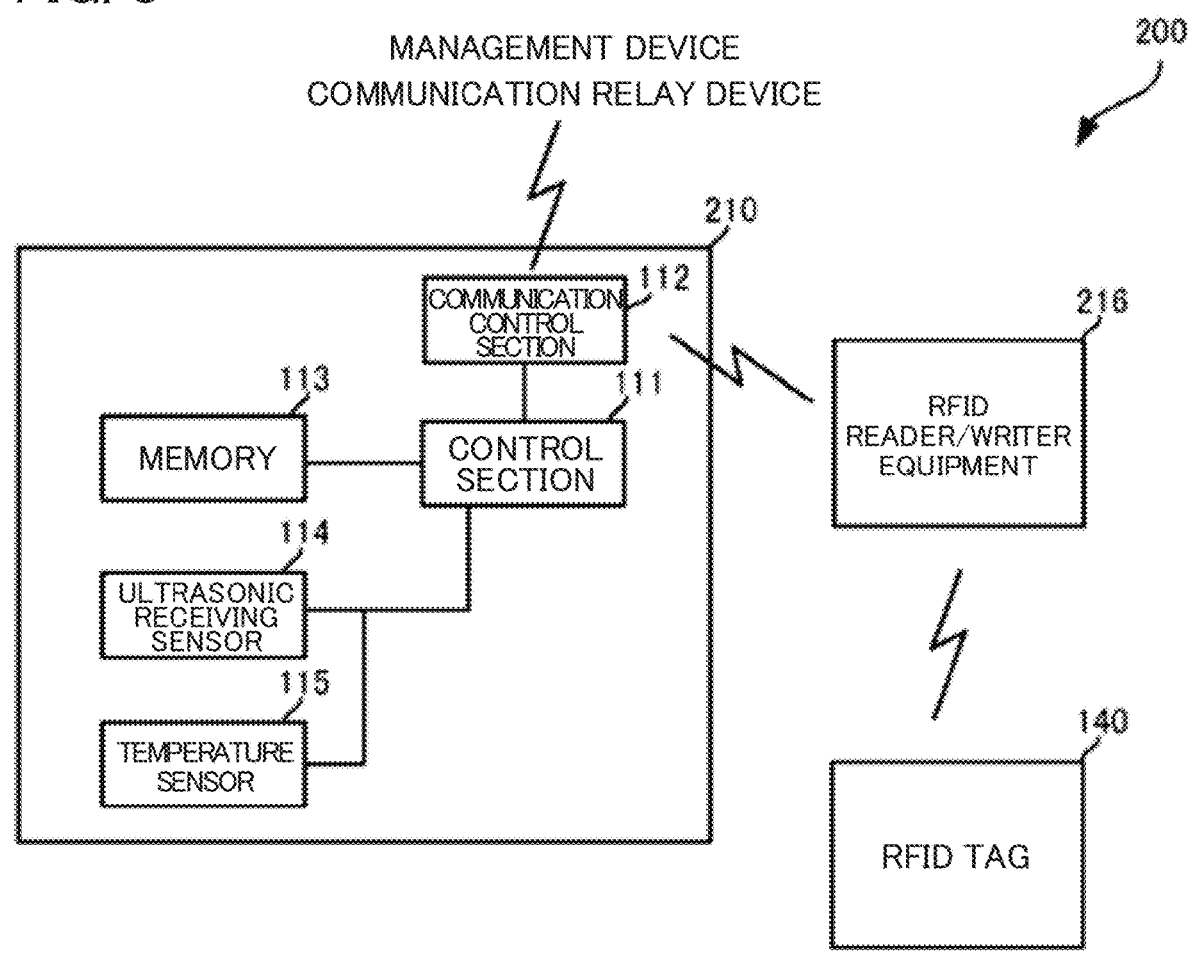
FIG. 8 is a view of a configuration of a trap management system as another embodiment of the equipment management system of the present application.

FIG. 8 is a diagram of a partial configuration of a trap management system 200. The trap management system 200 has a detection device 210, RFID reader equipment 216, an RFID tag 140, etc. The detection device 210 does not include an RFID reader/writer, and is configured to receive location information of the RFID tag 140 from the RFID reader equipment 216 via wireless communication. The RFID reader equipment 216 is of a transportable type wirelessly communicable with other devices, and has a reader function of the RFID tag 140. Moreover, since the RFID reader equipment 216 is of the transportable type, at least a single unit of the RFID reader equipment 216 may be provided without a need for providing the RFID reader equipment 216 for each placement of the detection device 210 and the RFID tag 140. Note that the RFID reader equipment 216 has a typical configuration, and therefore, detailed description thereof will not be made. Moreover, in this embodiment, registration completion information is not written in the RFID tag 140.

For example, after default setting of the detection device 210, an engineer operates the RFID reader equipment 216 to obtain the location information from the RFID tag 140, thereby transmitting such information to the detection device 210. A condition is a trigger for execution of new registration processing by the detection device 210, the condition being reception of the location information from the RFID reader equipment 216. That is, in this embodiment, the new registration processing excluding the processing of writing in the RFID tag 140 in the processing of the steps S10 and S13 shown in FIG. 7 is performed.

The detection device 210 and the RFID reader equipment 216 are separated from each other as described above so that an increase in the cost of the detection device 210 can be suppressed.

Note that in this embodiment, the location information is directly transmitted from the RFID reader equipment 216 to the detection device 210, but another terminal device may transmit the location information. For example, the location information may be transmitted from the RFID reader equipment 216 to a terminal device for performing the default setting, and the terminal device may transmit the location information to the detection device 210 upon the default setting.

Moreover, in this embodiment, the registration completion information is not written in the RFID tag 140, but may be written as in the first embodiment. In this case, RFID reader/writer equipment may be used instead of the RFID reader equipment 216. Moreover, in this case, when the detection device 210 is removed from a trap T, the registration completion information written in the RFID tag 140 may be, as in the first embodiment, deleted using the RFID reader/writer equipment.

Other Embodiments

In the above-described embodiments, the location information on the trap is stored in the RFID tag, but any storage unit may be used as long as the location information can be read. For example, a paper medium with a printed QR code (registered trademark) indicating the location information may be used. In this case, the location information is read using a QR code reader, and then, is transmitted to the detection device. Alternatively, the QR code reader may be built in the detection device. In this case, the arrangement locations of the paper medium and the detection device may be adjusted such that a reading section (an imaging section) of the QR code reader faces the paper medium. Further, a GPS receiver or a USB memory may be used as the storage unit.

Moreover, the location information stored in the RFID tag in each of the above-described embodiments is the map coordinate information, but is not limited to above as long as the location of the trap can be specified based on the information. For example, such information may be a longitude and a latitude or identification information on the trap. Note that in the case of the identification information on the trap, information including the identification information on the trap and the location information in association with each other may be prepared in advance.

In each of the above-described embodiments, the trap management system configured to manage the traps has been described, but the present disclosure is applicable as long as an equipment management system manages at least some of a plurality of components forming a facility. For example, the components include a heat exchanger and a boiler.

What is claimed:

1. An equipment management system including a management device configured to manage operation states of at least some components forming a facility, comprising:
   a plurality of detectors each arranged at the some components, each of the detectors being configured to detect state information on a corresponding one of the some components at which each of the detectors is arranged and to transmit the state information and identification information to the management device;
   a plurality of storage memories each arranged at the some components, each of the storage memories being configured to store location information on a corresponding one of the some components at which each of the storage memories is arranged, the plurality of storage memories being separated from the plurality of detectors;
   a reader configured to
   obtain the location information from at least one of the storage memories, and
   wirelessly transmit the location information to at least one of the detectors arranged at at least one of the some components at which the at least one of the storage memories is arranged,
   wherein the at least one of the detectors together wirelessly transmits the location information, which has been received from the reader, and the identification information to the management device; and
   a plurality of RFID writers, each arranged at the some components, each of the RFID writers being configured to update a content of each of the storage memories of a corresponding one of the some components at which each of the RFID writers is arranged,
   wherein each of the storage memories stores an association between the identification information and the location information for the corresponding one of the some components in the management device, and
   each of the RFID writers updates the association in each of the storage memories according to an instruction of each of the detectors of the corresponding one of the some components.

2. The equipment management system of claim 1, wherein
   the storage memories are RFID tags, and
   the reader includes RFID readers.

3. The equipment management system of claim 2, wherein the RFID readers are each included in the detection unitsdetectors.

4. The equipment management system of claim 1, wherein
   the some components are steam traps configured to discharge drain caused in the facility, and
   each of the detectors is configured to detect, as the state information, a temperature or vibration of a corresponding one of the steam traps.

5. An equipment management method for an equipment management system including a management device configured to receive, from detectors, state information on at least some components forming a facility to manage operation states of the some components, comprising:
   obtaining, by a communicable reader, location information on at least one of the some components from at least one of the storage memories arranged at the at least one of the some components and separated from the detectors;
   together wirelessly transmitting, after at least one of the detectors arranged at the at least one of the some components has received the location information on the at least one of the some components from the reader, the location information and identification information on the at least one of the detectors to the management device;
   controlling a plurality of RFID writers, each arranged at the some components, so that each of the RFID writers updates a content of each of the storage memories of a corresponding one of the some components at which each of the RFID writers is arranged, controlling each of the storage memories to store an association between the identification information and the location information for the corresponding one of the some components in the management device, and
controlling each of the RFID writers to update the association in each of the storage memories according to an instruction of each of the detectors of the corresponding one of the some components.

\* \* \* \* \*